No. 805,442. PATENTED NOV. 28, 1905.
F. H. BOGART.
AUTOMOBILE ENGINE SUSPENSION.
APPLICATION FILED APR. 4, 1905.

2 SHEETS—SHEET 2.

Witnesses

Inventor
Fred H. Bogart
By his Attorneys

UNITED STATES PATENT OFFICE.

FRED H. BOGART, OF NEW BRITAIN, CONNECTICUT, ASSIGNOR TO THE CORBIN MOTOR-VEHICLE CORPORATION, OF NEW BRITAIN, CONNECTICUT, A CORPORATION OF CONNECTICUT.

AUTOMOBILE-ENGINE SUSPENSION.

No. 805,442.   Specification of Letters Patent.   Patented Nov. 28, 1905.

Application filed April 4, 1905. Serial No. 253,817.

*To all whom it may concern:*

Be it known that I, FRED H. BOGART, a citizen of the United States, residing at New Britain, Connecticut, have invented certain new and useful Improvements in Automobile-Engine Suspension, of which the following is a full, clear, and exact description.

My invention relates to a means for suspending a motor and transmission mechanism in an automobile.

It is the purpose of my invention to so suspend the aforesaid mechanism that the alinement of the engine-shaft and the transmission-shaft will be accurately maintained.

Figure 1:
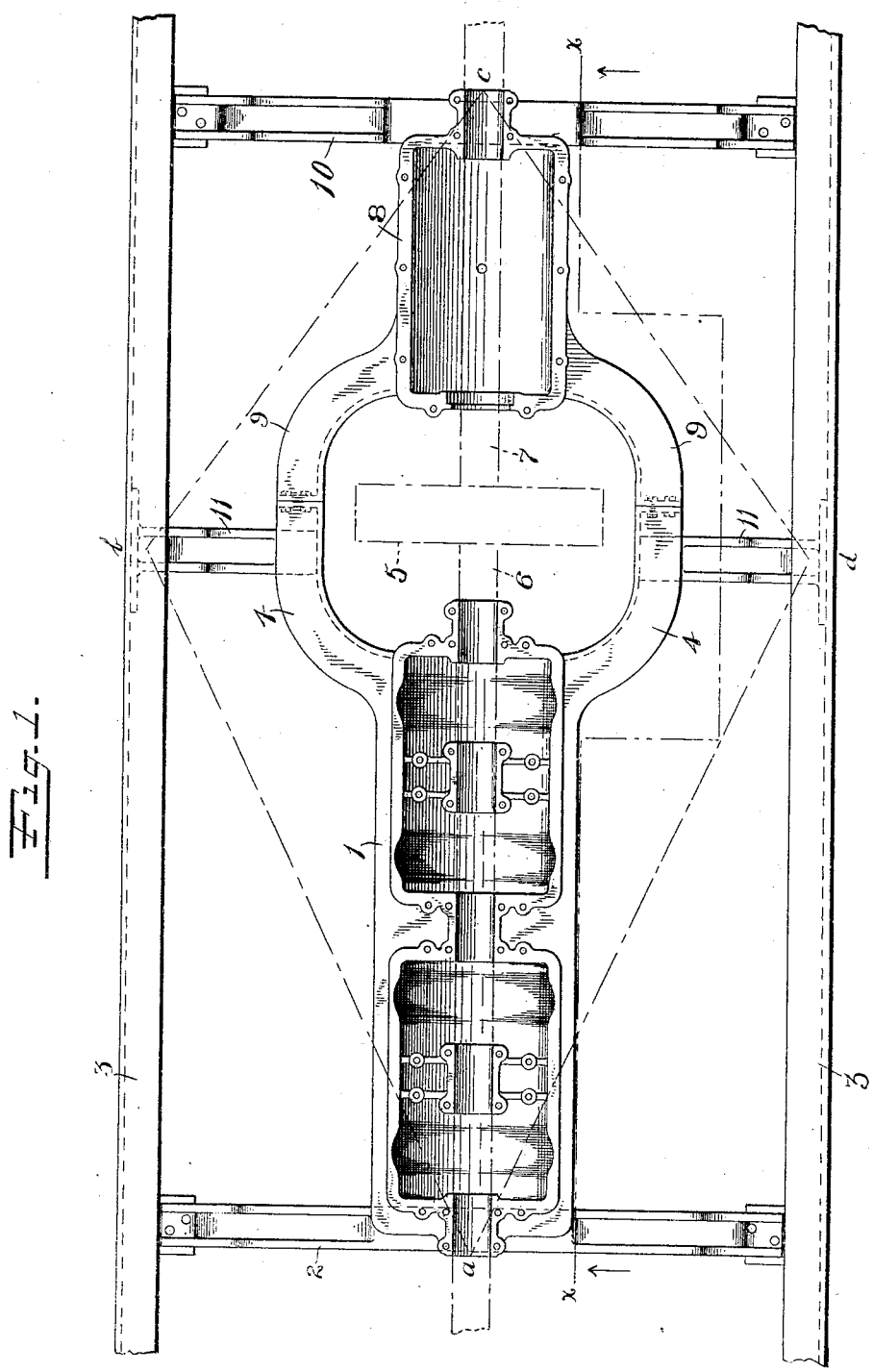
Figure 2:
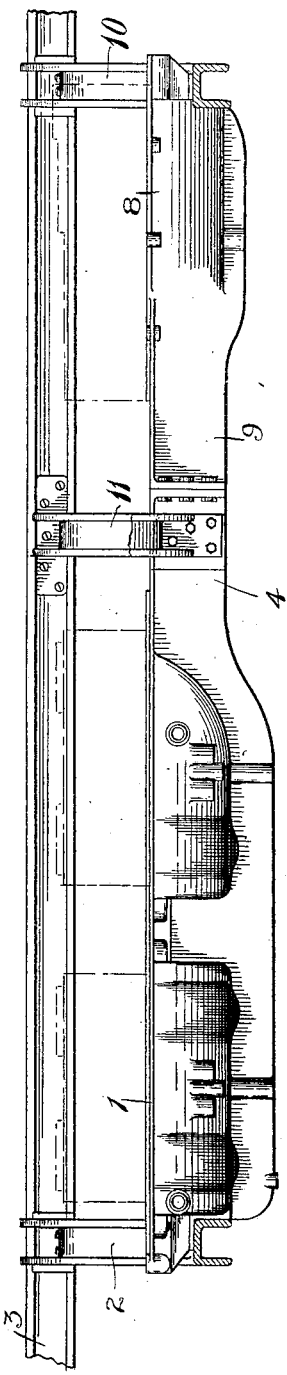
Figure 3:
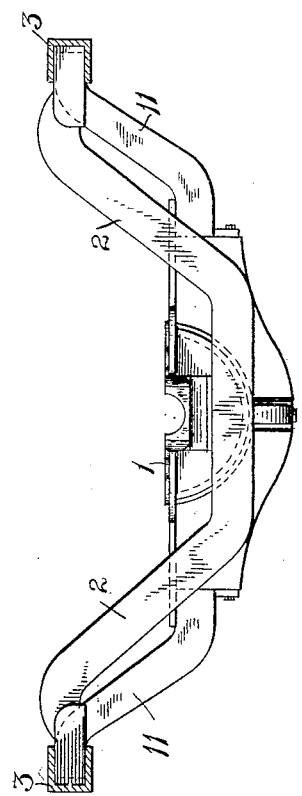

In the accompanying drawings, Figure 1 is a plan view of the portions of the sills of an automobile-chassis in turn supporting the base of the engine and the transmission mechanism. Fig. 2 is a section on the line $x$ $x$, Fig. 1. Fig. 3 is a front end elevation, the sills being shown in section.

1 represents the engine-base, supported at or near one end by a cross-beam 2, which constitutes a saddle. This cross-beam 2 is suitably connected at each end of the sills 3 3 of the chassis.

4 4 are diverging arms at or near the opposite ends of the engine-base 1. These arms diverge to give clearance for the fly-wheel 5. (Indicated in dotted lines.)

6 and 7 indicate in dotted lines, respectively, the engine-shaft and the transmission-shaft. It is most important that these two shafts be maintained in correct alinement. 8 represents the base of the gear-box, in which the transmission mechanism is located.

The engine and the transmission mechanism are not shown, since the particular form thereof constitutes no part of this invention.

9 9 are diverging arms at one end of the base 8, the said arms 9 9 being connected with the arms 4 4, whereby the engine-base 1 and the transmission-base 8 are practically an integral structure. The opposite end of the transmission-base 8 is supported centrally upon the cross-beam 10, the latter being supported at each end upon the sills 3 3.

Thus far described, it will be observed that the engine and transmission base is supported centrally relatively to the length of the wagon and in a line substantially parallel with the sills 3 3. At an intermediate point in the length of the engine and transmission base I connect the arms 11 11, which at their outer ends are connected with the sills 3 3. Obviously the arms 11 11 might be continuous instead of being separate pieces, as shown. These arms 11 11 support the engine and transmission base in a plane at substantially right angles to the longitudinal line of support.

From the foregoing it will be seen that the lines connecting the four points $a$ $b$ $c$ $d$ will form a diamond or kite-shaped outline. By supporting the engine and transmission base in this manner should the sills 3 3 twist out of their normal plane the same will be compensated for without throwing the engine-shaft and transmission-shaft out of alinement. This may perhaps be better understood by treating the intermediate base-support 11 11 as a shaft and treating the saddles 2 10 as mere links. When considered in this light, it will be seen that any twist in the sills 3 3 will not substantially alter the position of the central points of the said links, and hence the ends of the engine and transmission base will not be sprung out of alinement. By this arrangement I have found that the mechanism is more effective and durable than would otherwise be the case.

What I claim is—

1. In an automobile, a support for an engine and transmission mechanism comprising a continuous frame or base for said engine and transmission, said base being supported at or near its forward and rear ends in a line substantially parallel with the sills of the vehicle, and an intermediate support between the aforesaid supports and arranged at substantially right angles thereto.

2. In an automobile, a support for an engine and transmission mechanism comprising a frame or base for said parts, said base being supported at or near its forward and rear ends in a line substantially parallel with and centrally relatively to the sills of the vehicle, and a transverse support connecting said base with said sills at a point intermediate the length of said base.

FRED H. BOGART.

Witnesses:
  G. E. ROOT,
  L. M. BRAMEN.